Patented June 25, 1935

2,006,184

UNITED STATES PATENT OFFICE 2,006,184

TREATMENT OF RUBBER

Walther Schrauth, Berlin-Dahlem, Germany, assignor, by mesne assignments, to "Unichem" Chemikalien Handels A.-G., Zurich, Switzerland, a corporation of Switzerland No Drawing. Application October 9, 1930, Serial No. 487,505. In Germany October 22, 1929

9 Claims. (Cl. 18—50)

The present invention relates to improvements in or relating to the treatment of rubber.

It has been found according to this invention that alcohols of high molecular weight and in particular saturated and unsaturated alcohols of the fatty series, so called fatty and wax alcohols find useful application in the rubber and its allied industries as softeners, accelerators and anti-agers. Thus in the treatment and manufacture of rubber, caoutchouc masses and the like, especially good results are obtained if suitable quantities of alcohols of high molecular weight are added to the starting materials according to the character and quality of the latter. In this connection it may be stated that a relatively small addition of fatty or wax alcohols is sufficient to bring these mixtures to the desired degree of softness. The physical properties of the mixtures so obtained are particularly suitable for the subsequent treatment of the rubber. Apart from this these alcohols act as anti-agers since they exert a preservative action on the caoutchouc and thus good keeping qualities in the finished products are ensured. In suitably compounded mixtures the alcohols also act as vulcanization accelerators. It is to be understood that these alcohols of high molecular weight can be used alone or in admixture or combination with other substances. The expression "fatty and wax alcohols" is used in this specification to define those aliphatic alcohols having approximately 8 to 30 carbon atoms in the molecule. These alcohols and the corresponding fatty acids from which they can be produced by high pressure hydrogenation are discussed in the literature and their properties are described, see for example "Fats and Waxes" by Hilditch published in 1927. These alcohols are oily or solid at room temperature.

As an example of a method of carrying out this invention, during the treatment of a caoutchouc mass 5-10% dodecyl or octodecyl alcohol are added to the mass. An excellent finished product is obtained.

Apart from the specific action of alcohols of high molecular weight in the treatment of rubber, these alcohols also exert a preservative action on finished rubber articles. Thus for example if readily perishable finished articles such as conserve jar rings or semifinished articles such as regenerated mixtures are smeared or coated with a solution or mixture of such alcohols such for example as a mixture of octodecyl alcohol and octodecenyl alcohol, there forms on the surface of the treated rubber a thin film which even if only extremely thin prevents ageing and resists the very deleterious formation of cracks.

Having now particularly described and ascertained the nature of my said invention and in what manner the same is to be performed, I declare that what I claim is:

1. A process of treating caoutchouc, caoutchouc masses, regenerated rubber or finished rubber characterized in that caoutchouc, caoutchouc masses, regenerated rubber or finished rubber are subjected to the action of 5 to 10% of a mixture of octodecyl and octodecenyl alcohol.

2. A process of treating caoutchouc, caoutchouc masses, regenerated rubber or finished rubber characterized in that caoutchouc, caoutchouc masses, regenerated rubber or finished rubber are subjected to the action of approximately 5 to 10% of monohydric aliphatic alcohol containing approximately 12 to 18 carbon atoms in the molecule.

3. A process of treating caoutchouc, caoutchouc masses, regenerated rubber or finished rubber characterized in that caoutchouc, caoutchouc masses, regenerated rubber or finished rubber are subjected to the action of monohydric saturated aliphatic alcohol containing approximately 12 to 18 carbon atoms in the molecule.

4. A process of treating caoutchouc, caoutchouc masses, regenerated rubber or finished rubber characterized in that caoutchouc, caoutchouc masses, regenerated rubber or finished rubber are subjected to the action of monohydric aliphatic alcohol containing 12 to 18 carbon atoms in the molecule.

5. A process of treating caoutchouc, caoutchouc masses, regenerated rubber or finished rubber characterized in that caoutchouc, caoutchouc masses, regenerated rubber or finished rubber are subjected to the action of monohydric aliphatic alcohol containing 12 to 30 carbon atoms in the molecule.

6. A composition of matter comprising approximately 90 to 95% of material of the group consisting of coagulated caoutchouc, regenerated rubber and finished rubber and approximately 5 to 10% of monohydric fatty alcohol containing approximately 12 to 18 carbon atoms in the molecule.

7. A process of treating caoutchouc, caoutchouc masses, regenerated rubber or finished rubber characterized in that caoutchouc, caoutchouc masses, regenerated rubber or finished rubber are subjected to the action of 5 to 10% of octodecyl alcohol.

8. A composition of matter comprising material of the group consisting of coagulated caoutchouc, regenerated rubber and finished rubber and monohydric aliphatic alcohol of the group consisting of the fatty and wax alcohols having approximately 12 or more carbon atoms in the molecule.

9. A composition of matter comprising material of the group consisting of coagulated caoutchouc, regenerated rubber and finished rubber and stearyl alcohol.

WALTHER SCHRAUTH.